Oct. 29, 1963   H. M. ANTZ   3,108,952
CENTRIFUGE ROTOR WITH DISCHARGE NOZZLES AND MIXING DEVICE
Filed Oct. 11, 1961

INVENTOR.
Hans M. Antz
BY Davis, Hoxie, Faithfull & Hapgood
Attorneys

United States Patent Office 3,108,952
Patented Oct. 29, 1963

3,108,952
CENTRIFUGE ROTOR WITH DISCHARGE
NOZZLES AND MIXING DEVICE
Hans M. Antz, Hamburg-Reinbek, Germany, assignor to Bergedorfer Eisenwerk A.G., Hamburg-Bergedorf, Germany, a corporation of Germany
Filed Oct. 11, 1961, Ser. No. 144,334
3 Claims. (Cl. 233—14)

This invention relates to centrifugal separators of the type in which the centrifugal rotor is provided with peripheral nozzles for discharge of a heavier separated component. More particularly, the invention relates to a centrifuge of this type wherein the rotor is provided with a novel arrangement for mixing an additive with the heavy separated component discharged from the peripheral nozzles.

The centrifuge of the present invention may be used to particular advantage in the production of cream cheese and will be described specifically in connection with such use. However, it will be understood that the new centrifuge may also be used to advantage for incorporating an additive into any heavy separated component discharged from the peripheral nozzles of the centrifugal rotor.

Skim milk with low fat content is used for the production of a lean curd which is separated from the whey in a centrifugal rotor and discharged by means of nozzles located at the outer periphery or largest diameter of the rotor. For example, the mix of curd and whey may be derived from skim milk having a fat content exceeding 0.5 percent. When such a mix is fed into the centrifugal rotor, the surplus milk fat shifts toward the whey so that the latter, in relation to the curd, represents the lighter component. This phenomenon is due to the fact that the curd does not entirely enclose all of the milk fat, but a fraction of the milk fat lies on the surface of the curd and is therefore discharged from the rotor with the separated whey as the lighter component.

If cream cheese is to be produced with a fat content of 40%, for example, the lean curd separated as the heavier component in the rotor must generally be fortified or "fattened" with cream. The addition of the cream and its admixture to the lean curd have heretofore been carried out by hand or by means of a separate mixing device. This process requires considerable time and does not always result in a final cream cheese product having a uniform fat distribution. Moreover, it is desirable to carry out the admixture of cream to the lean curd, as well as the packing and refrigeration of the product, as quickly as possible in order to impede post-acidulation and thereby improve the quality of the cream cheese product when it is ready for consumption.

The principal object of the present invention, therefore, is to provide a centrifuge of the type described having a centrifugal rotor operable to effect a rapid and continuous "fattening" of the cream cheese curd separated as the heavy component in the rotor.

According to the present invention, the centrifugal rotor has a separating chamber and a plurality of heavy component discharge nozzles spaced around the outer peripheral portion of the rotor and communicating with the outer portion of the separating chamber for discharging the curd or other separated heavy component. Additive discharge nozzles are also spaced around the outer peripheral portion of the rotor and are located between the heavy component discharge nozzles, the additive discharge nozzles being closed from the separating chamber. The rotor has a light component outlet located nearer the rotor axis than are the nozzles and which serves to discharge a separated light component from the separating chamber. The rotor also has a main feed channel leading to the separating chamber. Additive feed channels in the rotor are separate from this main channel and lead outward from the rotor axis to each additive discharge nozzle. The mixture to be separated is supplied to the main feed channel by a stationary feed tube, and a second stationary feed tube supplies an additive liquid to the additive feed channel. The discharge from all of the peripheral nozzles may be collected in a stationary vessel surrounding the rotor.

With the new centrifuge construction, the cream or other additive is discharged under centrifugal force from the additive nozzles while the cream cheese curd or other separated heavy component is being discharged under centrifugal force from the other nozzles between which the additive nozzles lie. Thus, the cream reaches the lean curd in thin layers with a high velocity in a misty state, which brings about an intimate mixing of the lean curd and the cream.

These and other features of the invention may be better understood by reference to the following detailed description taken in conjunction with the accompanying drawing, in which FIG. 1 is a vertical sectional view of a preferred form of the new centrifugal separator;

Figure 1:
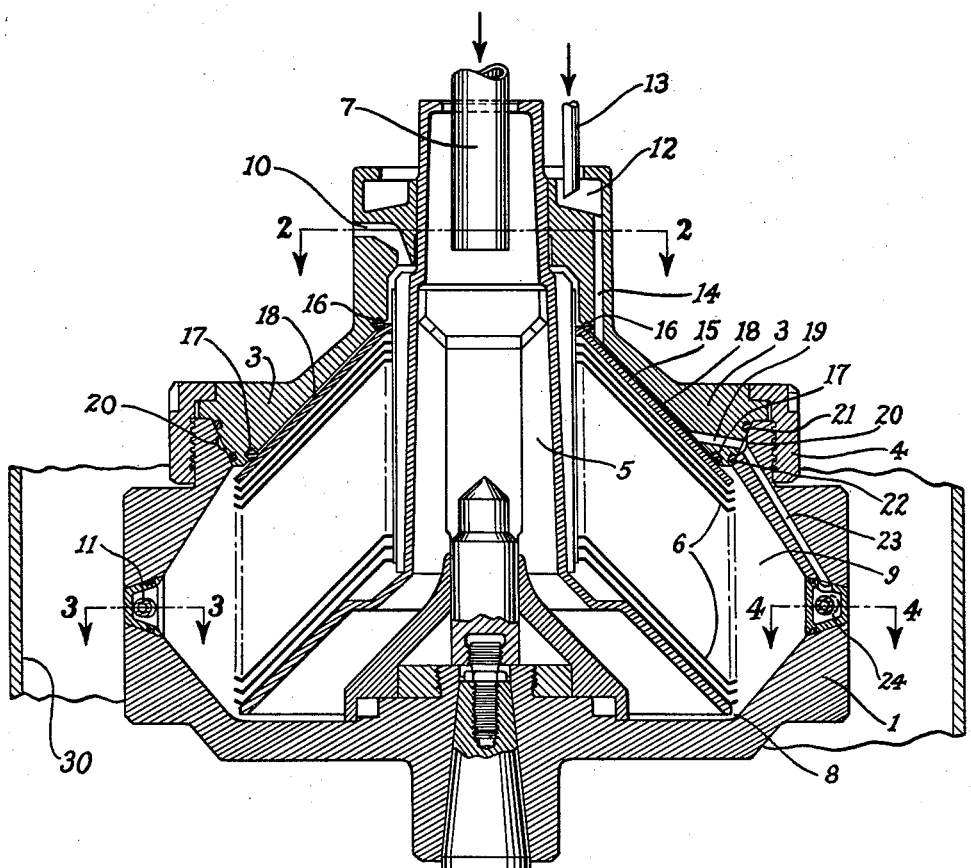
Figure 3:
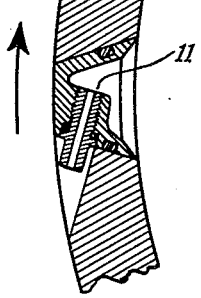
FIG. 3 is a sectional view on line 3—3 in FIG. 1, showing one of the heavy component discharge nozzles.
Figure 2:
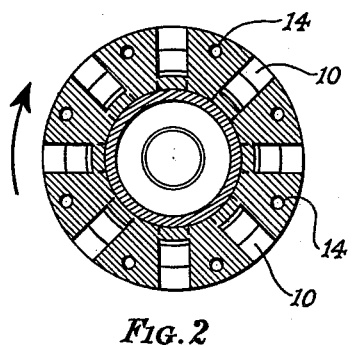
FIG. 2 is a sectional view on line 2—2 in FIG. 1, showing the neck portion of the rotor.

Referring to the drawing, the reference numeral 1 designates the main body or bottom of the rotor, which is secured to and rotated by a vertical shaft 2. A top or hood 3 is releasably connected to the rotor bottom 1 by a threaded ring 4, which may be unscrewed to permit separation of the parts 1 and 3. The rotor 1—3 contains the usual central distributor 5 secured to the rotor bottom 1 and carrying a set of conical discs 6. The cheese mix, consisting of curds as a heavier component and whey as a lighter component, is supplied by a stationary feed pipe 7 through the open top of the central distributor 5 and flows downwardly through the usual distributor passages to an annular slit 8 located between the rotor bottom and the flared lower portion of distributor 5. From the slit 8, the mix flows into the separating chamber of the rotor at the region of the outer portions of the spaced conical discs 6. Under the action of centrifugal force, the main part of the curd is separated and collected in the outer portion 9 of the separating chamber, which may be referred to as a sludge space. The whey with a low content of unseparated curd flows inwardly into the set of discs 6, where the fine curd particles are separated and slide outwardly along the under sides of the discs, so that these fine particles are also collected in the sludge space 9. The clear whey is displaced inwardly between the discs and then upwardly through vertical channels to discharge openings 10 spaced around the upper neck portion of the rotor.

At its outer peripheral portion, the rotor 1—3 is provided with a plurality of discharge nozzles 11 spaced around the rotor axis. Each nozzle 11, as shown, communicates at its inner end with the sludge space 9 of the separating chamber and extends through the rotor wall generally tangentially thereto in the direction opposite to the direction of rotation of the rotor. The separated curd component in sludge space 9 is continuously discharged through the peripheral nozzles 11, from which the curds are flung outwardly under centrifugal force into a stationary collecting vessel 30 surrounding the rotor. Through a bottom opening in vessel 30, the curds may be discharged into a portable container (not shown).

According to the invention, the centrifugal rotor is provided in its upper or neck portion with an annular chamber 12 surrounding the central distributor 5. Cream with a predetermined fat content is supplied to chamber 12 through a stationary feed tube 13 extending downward through the open top of the annular chamber 12. From chamber 12, the cream flows downward through vertical channels 14 in the rotor neck and into a chamber 18 between the rotor hood 3 and a top disc 15 overlying the disc set 6. The chamber 18 is of conical shape, and is sealed at its upper and lower portions by annular packing rings 16 and 17. From the lower or outer portion of chamber 18, the cream flows outwardly through channels 19 into an annular passage or groove 20 formed between the rotor bottom 1 and hood 3. The groove 20 is concentric to the rotor axis, and lies between packing rings 21 and 22 compressed between parts 1 and 3. Channels 23 in the rotor bottom lead outwardly and downwardly from groove 20 to cream or additive discharge nozzles 24 which are located in the same horizontal plane as nozzles 11.

Figure 4:
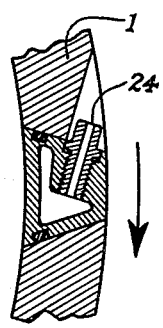
FIG. 4 is a sectional view on line 4—4 in FIG. 1, showing one of the additive discharge nozzles.

Nozzles 24 are spaced around the rotor periphery between the curd or heavy component discharge nozzles 11, so that nozzles 24 alternate with discharge nozzles 11 around the rotor periphery. For example, there may be five nozzles 24 spaced 72° apart lying between five nozzles 11 also spaced 72° apart. Nozzles 24, unlike nozzles 11, are closed from the separating chamber and sludge space 9, as shown particularly in FIG. 4. Each nozzle 24 is in the form of a frusto-conical hollow insert fitted closely in an opening through the rotor wall, the enlarged inner end of the insert being closed. An opening in the conical periphery of the insert communicates with the lower or outer end of a corresponding channel 23 through which the cream is supplied to the nozzle insert. The nozzle proper 24 leads from the hollow interior of the insert to the outside of the rotor, generally tangentially thereto and in the direction opposite to the direction of rotation.

In the operation of the new centrifuge as illustrated, the cheese mix of curds and whey is fed continuously to the separating chamber of the rotor through stationary feed tube 7, while the cream for "fattening" of the separated curd is fed continuously to chamber 12 through stationary feed tube 13. Thus, the separated lean curd is discharged continuously through nozzles 11 while the cream is discharged continuously through nozzles 24. As a result, the lean curd discharged at high velocity from nozzles 11 is "fattened" with the cream discharged at high velocity from nozzles 24, the cream reaching the lean curd in thin layers with a high velocity in a misty condition, which brings about an intermittent mixing of the lean curd and the cream. The cream-enriched curd thus formed, constituting cream-cheese, can be refrigerated immediately thereafter. Consequently, the quality of the final product is considerably improved due to relatively short duration of the processing involved, and post-acidulation is impeded.

It will be understood that the resulting cream-cheese may be given any desired fat content by providing the cream from feed tube 13 with the proper fat content. Also, by cutting off the supply of cream through feed tube 13, the curd may be recovered in substantially fat-free form from the collecting vessel 30.

The use of the new centrifuge is not limited to the "fattening" of cheese curds. For example, spices, aromatic agents or fruit juices, to the extent that they are in fluid form so that they will flow through the additive discharge nozzles 24, may be admixed continuously and in measured quantities with the heavy separated component discharging through nozzles 11.

I claim:
1. In a centrifugal separator for combining an additive with a centrifugally separated heavier component, the combination of a hollow centrifugal rotor having a separating chamber and a peripheral wall surrounding said chamber, a plurality of heavy component discharge nozzles spaced around said peripheral wall of the rotor and communicating with the outer portion of said chamber for discharging a separated heavy component therefrom, a plurality of additive discharge nozzles spaced around said peripheral wall of the rotor and located between said heavy component discharge nozzles, said additive discharge nozzles being closed from said chamber, said peripheral wall having solid portions separating each additive discharge nozzle from the heavy component discharge nozzles between which said additive discharge nozzle is located, each of the nozzles having a discharge end located at the outside of said peripheral wall and which is separate from the discharge ends of the other nozzles, the rotor having a light component outlet located nearer the rotor axis than are said nozzles and communicating with said chamber for discharging a separated light component therefrom, the rotor having a main feed channel leading to said chamber and also having additive feed channels separate from said main channel and leading outward from the rotor axis to each additive discharge nozzle, a first stationary feed tube for supplying a mixture to be separated to said main feed channel, a second stationary feed tube for supplying an additive liquid to said additive feed channels, and a collecting vessel surrounding the rotor in spaced relation thereto and against which the separated heavy component is discharged centrifugally from the heavy component discharge nozzles while being mixed with said additive from the additive discharge nozzles.

2. The combination according to claim 1, in which said additive feed channels include a common portion adapted to receive the additive liquid from said second feed tube and also include branch channels located in the peripheral wall of the rotor and leading from said common portion to the respective additive discharge nozzles.

3. The combination according to claim 1, in which said additive feed channels include a common portion adapted to receive the additive liquid from said second feed tube and also include branch channels located in the peripheral wall of the rotor and leading from said common portion to the respective additive discharge nozzles, the rotor comprising a main body and a top releasably connected to each other and defining between them a passage extending at least partly around the rotor axis, said passage forming part of said common portion from which said branch channels lead.

References Cited in the file of this patent

UNITED STATES PATENTS

| | | |
|---|---|---|
| 1,268,630 | Ruth | June 4, 1918 |
| 1,866,638 | Fawcett | July 12, 1932 |
| 1,927,822 | Coe | Sept. 26, 1933 |
| 2,688,437 | Monnet | Sept. 7, 1954 |
| 2,917,230 | Kaldewey | Dec. 15, 1959 |
| 2,958,461 | Peltzer | Nov. 1, 1960 |

FOREIGN PATENTS

| | | |
|---|---|---|
| 79,024 | Sweden | Nov. 28, 1933 |
| 387,298 | Great Britain | Feb. 2, 1933 |